(12) United States Patent
Jiang et al.

(10) Patent No.: US 11,367,276 B2
(45) Date of Patent: Jun. 21, 2022

(54) TARGET DETECTION METHOD AND APPARATUS

(71) Applicant: HANGZHOU EZVIZ SOFTWARE CO., LTD., Zhejiang (CN)

(72) Inventors: Nicong Jiang, Zhejiang (CN); Jianhua Zhu, Zhejiang (CN); Bingwei Shen, Zhejiang (CN); Bin Guo, Zhejiang (CN); Haiqing Jiang, Zhejiang (CN)

(73) Assignee: Hangzhou Ezviz Software Co., Ltd., Zhejiang (CN)

( * ) Notice: Subject to any disclaimer, the term of this patent is extended or adjusted under 35 U.S.C. 154(b) by 0 days.

(21) Appl. No.: 16/954,751

(22) PCT Filed: Nov. 15, 2018

(86) PCT No.: PCT/CN2018/115641
§ 371 (c)(1),
(2) Date: Jun. 17, 2020

(87) PCT Pub. No.: WO2019/120011
PCT Pub. Date: Jun. 27, 2019

(65) Prior Publication Data
US 2020/0320296 A1    Oct. 8, 2020

(30) Foreign Application Priority Data

Dec. 22, 2017    (CN) .......................... 201711405618.6

(51) Int. Cl.
*G06V 20/10* (2022.01)
*G06V 20/52* (2022.01)
(Continued)

(52) U.S. Cl.
CPC ............ *G06V 20/10* (2022.01); *A47L 9/2826* (2013.01); *A47L 9/2842* (2013.01);
(Continued)

(58) Field of Classification Search
USPC ........................................................ 382/103
See application file for complete search history.

(56) References Cited

U.S. PATENT DOCUMENTS 6,421,451 B1 *   7/2002   Shiratsuchi ......... G06K 9/2036
                                                                356/613
6,465,801 B1 *  10/2002   Gann .................. G01N 21/8806
                                                                250/559.4
(Continued)

FOREIGN PATENT DOCUMENTS

CN           1731417 A     2/2006
CN           1731418 A     2/2006
(Continued)

OTHER PUBLICATIONS

Morimoto et al., Automated Iris Segmentation Using Active Near Infra Red Lighting, 2005, IEEE, 1530-1834/05., pp. 1-7. (Year: 2005).*

(Continued)

*Primary Examiner* — Ishrat I Sherali
(74) *Attorney, Agent, or Firm* — Meunier Carlin & Curfman LLC

(57) ABSTRACT

The embodiments of the present application provides a target detection method, which comprises: obtaining a plurality of images acquired by an image acquiring device as images to be detected when a region to be detected is illuminated by light sources with different illuminating angles, wherein the different illuminating angles correspond to the different images to be detected (S101); and determining whether a target exists in the region to be detected based on gray scale differences between the obtained images to be detected with illuminating by the light sources of with different illuminating angles (S102). The method is applied (Continued)

to achieve a simple and effective detection of the target existing in the region to be detected.

19 Claims, 4 Drawing Sheets

(51) Int. Cl.
  *G06T 7/50* (2017.01)
  *A47L 9/28* (2006.01)
  *G06K 9/62* (2022.01)
  *G06V 10/141* (2022.01)

(52) U.S. Cl.
  CPC .............. *G06K 9/6215* (2013.01); *G06T 7/50* (2017.01); *G06V 10/141* (2022.01); *A47L 2201/06* (2013.01); *G06T 2207/10152* (2013.01)

(56) References Cited

U.S. PATENT DOCUMENTS

| | | | |
|---|---|---|---|
| 7,535,562 B2* | 5/2009 | Matsui | G01N 21/8806 356/237.2 |
| 10,670,387 B2* | 6/2020 | Stoppe | G02B 7/32 |
| 10,705,029 B2* | 7/2020 | Nagata | G01N 21/8806 |
| 10,755,429 B2* | 8/2020 | Stoppe | G06T 7/586 |
| 2001/0055409 A1* | 12/2001 | Shiratsuchi | G06K 9/2036 382/101 |
| 2012/0099172 A1* | 4/2012 | Ohki | G02B 21/088 359/239 |
| 2012/0154577 A1 | 6/2012 | Yoshikawa | |
| 2015/0087902 A1* | 3/2015 | Mertz | G01N 21/27 600/109 |
| 2015/0316648 A1 | 11/2015 | Nakahata et al. | |
| 2016/0370172 A1 | 12/2016 | Christoph et al. | |
| 2017/0219495 A1* | 8/2017 | Nagata | G01N 21/95607 |
| 2017/0307544 A1* | 10/2017 | Nagata | G01N 21/95684 |

FOREIGN PATENT DOCUMENTS

| | | |
|---|---|---|
| CN | 1738426 A | 2/2006 |
| CN | 101277429 A | 3/2007 |
| CN | 101251658 A | 8/2008 |
| CN | 101464132 A | 6/2009 |
| CN | 101727671 A | 6/2010 |
| CN | 101950355 A | 1/2011 |
| CN | 102629378 A | 8/2012 |
| CN | 102629380 A | 8/2012 |
| CN | 103164693 A | 6/2013 |
| CN | 103226838 A | 7/2013 |
| CN | 103793921 A | 5/2014 |
| CN | 201410279429 A | 6/2014 |
| CN | 104007444 A | 8/2014 |
| CN | 106157219 A | 11/2016 |
| CN | 106485735 A | 3/2017 |
| CN | 106503605 A | 3/2017 |
| CN | 106558038 A | 4/2017 |
| CN | 106791433 A | 5/2017 |
| CN | 107255458 A | 10/2017 |
| WO | 2016015546 A1 | 2/2016 |
| WO | 2016061244 A1 | 4/2016 |
| WO | 2016099321 A1 | 6/2016 |

OTHER PUBLICATIONS

Gurtner et al., Twin-beam real-time position estimation of micro-objects in 3D, Feb. 1, 2017, arXiv: 1701.08963v2 [physics.ins-det], pp. 1-8. (Year: 2017).*
Extended European Search Report, Application No. EP 18893123.2-1207/3731180 PCT/CN2018115641, dated Dec. 23, 2020.
Carlos H. Morimoto, Automatic Iris Segmentation Using Active Near Infra Red Lighting, Proceedings of the XVIII Brazilian Symposium on Computer Graphics and Image Processing, 2005.
International Search Report, issued in corresponding application No. PCT/CN2018/115641, dated Feb. 15, 2019, 4 pages.
Research on Moving Objects Detection and Tracking Methods in Intelligent Visual Surveillance System. Mar. 2012. 133 pages. English Abstract included in text.
Li Guang-Iun, et al., Real-time Detection for Moving Object in Video Monitor System. Computer Engineering 35:17, pp. 217-218, Sep. 2009. English Abstract included in text.
Notification to Grant issued for Chinese Application No. 201711405618.6, dated Feb. 14, 2022.

* cited by examiner

TARGET DETECTION METHOD AND APPARATUS

The present application claims the priority to a China patent application No. 201711405618.6 filed with China National Intellectual Property Administration on Dec. 22, 2017 and entitled "Target Detection Method and Apparatus", which is incorporated herein by reference in its entirety.

TECHNICAL FIELD

The present application relates to the technical field of image processing, and in particular, to a target detection method and apparatus.

BACKGROUND

In the field of target detecting, related target detection methods generally use a hybrid Gaussian algorithm to detect whether a target exists in a target scene.

However, in the process of detecting whether a target exists in the target scene by using the hybrid Gaussian algorithm, an electronic device needs to acquire images for the target scene, establish a Gaussian model based on the acquired images, and continuously update the established Gaussian model during the process of detecting. In this way, the amount of calculation in detecting is large and complex and the methods are not simple enough.

Therefore, how to provide a simple target detection method has become an urgent problem to be solved.

SUMMARY

The object of the embodiments of the present application is to provide a target detection method and an apparatus to achieve a simple and effective detection of the target. The specific technical solution is as follows:

In one aspect, an embodiment of the present application provides a target detection method, which comprises:

obtaining a plurality of images acquired by an image acquiring device when a region to be detected is illuminated by light sources with different illuminating angles as images to be detected, wherein the different illuminating angles correspond to different images to be detected; and determining whether a target exists in the region to be detected based on gray scale differences among the obtained images to be detected with illuminating by the light sources with different illuminating angles.

Optionally, the light sources with different illuminating angles comprise: a direct incidence light source with a beam emission direction perpendicular to a plane where the region to be detected is located, and an oblique incidence light source with a beam emission direction not perpendicular to the plane where the region to be detected is located;

the images to be detected comprise a first image to be detected corresponding to a direct incidence light source, and a second image to be detected corresponding to an oblique incidence light source;

determining whether a target exists in the region to be detected based on gray scale differences among the obtained images to be detected with illuminating by the light sources with different illuminating angles comprises:

determining a first region image from the first image to be detected and a second region image from the second image to be detected based on an optical axis of the image acquiring device and a preset re-projection rule, wherein there is a corresponding relationship between pixels of the first region image and pixels of the second region image, and pixels with the corresponding relationship correspond to points at the same position in the region to be detected;

calculating a similarity value between the first region image and the second region image, based on gray scale values of each pixel of the first region image and the second region image; and determining whether a target exists in the region to be detected based on the calculated similarity value.

Optionally, the optical axis of the image acquiring device is perpendicular to a plane where the region to be detected is located; a distance between the image acquiring device and the direct incidence light source is not more than a first preset distance; a distance between the image acquiring device and the oblique incidence light source is not less than a second preset distance, and the second preset distance is larger than the first preset distance.

Optionally, determining a first region image from the first image to be detected and a second region image from the second image to be detected based on an optical axis of the image acquiring device and a preset re-projection rule includes:

determining an intersection point of an extension line of the optical axis of the image acquiring device with the plane where the region to be detected is located as a center point;

determining a target region from the region to be detected based on the center point and a preset length; and determining a first region image corresponding to the target region from the first image to be detected and a second region image corresponding to the target region from the second image to be detected based on a preset projection formula and coordinates of points of the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located, the $\rho$ represents a preset factor of proportionality; the s represents a preset factor of non-perpendicularity of the first horizontal axis to the first longitudinal axis; the $(c_x, c_y)$ represents coordinates of an optical center of the image acquiring device in the image coordinate system where the first region image is located; the (u, v) represents coordinates of pixels of the first region image in the image coordinate system where the first region image is located; the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system; or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis; the $(c_x, c_y)$ represents coordinates of an optical center of the image acquiring device in the image coordinate system where the second region image is located; the (u, v) represents coordinates of the pixels of the second region image in the image coordinate system where the second region image is located, the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system.

Optionally, calculating a similarity value between the first region image and the second region image, based on gray scale values of each pixel of the first region image and the second region image includes:

normalizing a gray scale value of each pixel of the first region image to obtain the normalized gray scale values of each pixel of the first region image;

normalizing a gray scale value of each pixel of the second region image to obtain the normalized gray scale values of each pixel of the second region image; and calculating the similarity value between the first region image and the second region image based on a normalized cross-correlation algorithm, the normalized gray scale value of each pixel of the first region image, and the normalized gray scale value of each pixel of the second region image.

Optionally, determining whether a target exists in the region to be detected based on the calculated similarity value includes:

determining whether the calculated similarity value is less than a preset similarity threshold;

when the calculated similarity value is less than the preset similarity threshold, determining that a target exists in the region to be detected; and when the calculated similarity value is not less than the preset similarity threshold, determining that no target exists in the region to be detected.

Optionally, after determining that a target exists in the region to be detected, the method further includes:

determining a gray scale difference image between the first region image and the second region image based on the gray scale values of each pixel of the first region image and the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix}$$

the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis, the $(c_x, c_y)$ represents coordinates of an optical center of the image acquiring device in the image coordinate system where the second region image is located; the (u, v) represents coordinates of the pixels of the second region image in the image coordinate system where the second region image is located, the $(X_C, Y_C, Z_C)$ represents coordinates of points of the second projection region in a preset three-dimensional rectangular coordinate system, and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

Optionally, determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system includes:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target; and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

Optionally, determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system includes:

determining a point corresponding to a minimum horizontal coordinate value as a first point from the points in the second projection region, based on coordinates of points of the second projection region in the preset three-dimensional rectangular system:

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system; and using an absolute value of the difference between the longitudinal coordinate value of each point in the pair of target points as a maximum cross-section length in the shape information of the target.

Optionally, determining the type of the target based on the shape information of the target includes:

calculating a ratio of the maximum cross-section length of the target to the target height of the target; and determining the type of the target according to the calculated ratio, wherein when the calculated ratio is less than or equal to a first preset threshold, determining that the type of the target is a silk-like object; when the calculated ratio is more than the first preset threshold and less than or equal to a second preset threshold, determining that the type of the target is a granular object; when the calculated ratio is more than the second preset threshold, determining that the type of the target is a floc-like object.

Optionally, the method is applied to a cleaning robot, after determining the type of the target according to the calculated ratio, the method further includes:

adjusting operating power of a cleaning component of the cleaning robot according to the determined type of the target.

In another aspect, an embodiment of the present application provides a target detecting apparatus, which comprises: light sources with different illuminating angles, an image acquiring device, and a processor;

the light sources with different illuminating angles are configured for illuminating the region to be detected:

the image acquiring device is configured for acquiring images when a region to be detected is illuminated by the light sources with different illuminating angles; and the processor is configured for obtaining the images acquired by the image acquiring device as images to be detected and determining whether a target exists in the region to be detected based on gray scale differences among the obtained images to be detected with illuminating by the light sources of with different illuminating angles.

Optionally, the processor comprises:

a first obtaining module, configured for obtaining a plurality of images acquired by an image acquiring device when a region to be detected is illuminated by light sources with different illuminating angles as images to be detected, wherein the different illuminating angles correspond to different images to be detected; and a first determining module, configured for determining whether a target exists in the region to be detected based on gray scale differences among the obtained images to be detected with illuminating by the light sources with different illuminating angles.

Optionally, the light sources with different illuminating angles comprise: a direct incidence light source with a beam emission direction perpendicular to a plane where the region to be detected is located, and an oblique incidence light source with a beam emission direction not perpendicular to the plane where the region to be detected is located;

the images to be detected comprise: a first image to be detected corresponding to a direct incidence light source, and a second image to be detected corresponding to an oblique incidence light source;

the first determining module is specifically configured for:

determining a first region image from the first image to be detected and a second region image from the second image to be detected based on an optical axis of the image acquiring device and a preset re-projection rule, wherein there is a corresponding relationship between pixels of the first region image and pixels of the second region image, and pixels with the corresponding relationship correspond to points at the same position in the region to be detected:

calculating a similarity value between the first region image and the second region image, based on gray scale values of each pixel of the first region image and the second region image; and determining whether a target exists in the region to be detected based on the calculated similarity value.

Optionally, the optical axis of the image acquiring device is perpendicular to a plane where the region to be detected is located; a distance between the image acquiring device and the direct incidence light source is not more than a first preset distance, a distance between the image acquiring device and the oblique incidence light source is not less than a second preset distance; and the second preset distance is larger than the first preset distance.

Optionally, the first determining module is specifically configured for:

determining an intersection point of an extension line of the optical axis of the image acquiring device with the plane where the region to be detected is located as a center point;

determining a target region from the region to be detected based on the center point and a preset length; and determining a first region image corresponding to the target region from the first image to be detected and a second region image corresponding to the target region from the second image to be detected based on a preset projection formula and coordinates of points of the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located; the $\rho$ represents a preset factor of proportionality, the s represents a preset factor of non-perpendicularity of the first horizontal axis to the first longitudinal axis; the $(c_x, c_y)$ represents coordinates of an optical center of the image acquiring device in the image coordinate system where the first region image is located; the (u, v) represents coordinates of pixels of the first region image in the image coordinate system where the first region image is located; the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system; or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis, the $(c_x, c_y)$ represents coordinates of an optical center of the image acquiring device in the image coordinate system where the second region image is located; the (u, v) represents coordinates of the pixels of the second region image in the image coordinate system where the second region image is located, the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system.

Optionally, the first determining module is specifically configured for:

normalizing a gray scale value of each pixel of the first region image to obtain the normalized gray scale values of each pixel of the first region image;

normalizing a gray scale value of each pixel of the second region image to obtain the normalized gray scale values of each pixel of the second region image; and calculating the similarity value between the first region image and the second region image based on a normalized cross-correlation algorithm, the normalized gray scale value of each pixel of the first region image, and the normalized gray scale value of each pixel of the second region image.

Optionally, the first determining module is specifically configured for:

determining whether the calculated similarity value is less than a preset similarity threshold:

when the calculated similarity value is less than the preset similarity threshold, determining that a target exists in the region to be detected; and when the calculated similarity value is not less than the preset similarity threshold, determining that no target exists in the region to be detected.

Optionally, the first determining module is further configured for:

after determining that a target exists in the region to be detected, the method, determining a gray scale difference image between the first region image and the second region image based on the gray scale values of each pixel of the first region image and the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located, the $\rho$ represents a preset factor of proportionality; the s represents a preset factor of non-perpendicularity of the third horizontal axis to the third longitudinal axis; the $(c_x, c_y)$ represents coordinates of an optical center of the image acquiring device in the image coordinate system where the second region image is located, the (u, v) represents coordinates of the pixels of the second region image in the image coordinate system where the second region image is located; the $(X_C, Y_C, Z_C)$ represents coordinates of points of the second projection region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

Optionally, the first determining module is specifically configured for:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target, and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

Optionally, the first determining module is specifically configured for:

determining a point corresponding to a minimum horizontal coordinate value as a first point from the points in the second projection region, based on coordinates of points of the second projection region in the preset three-dimensional rectangular system;

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system, and using an absolute value of the difference between the longitudinal coordinate value of each point in the pair of target points as a maximum cross-section length in the shape information of the target.

Optionally, the first determining module is specifically configured for:

calculating a ratio of the maximum cross-section length of the target to the target height of the target, and determining the type of the target according to the calculated ratio, wherein when the calculated ratio is less than or equal to a first preset threshold, determining that the type of the target is a silk-like object, when the calculated ratio is more than the first preset threshold and less than or equal to a second preset threshold, determining that the type of the target is a granular object, when the calculated ratio is more than the second preset threshold, determining that the type of the target is a floc-like object.

Optionally, the apparatus is applied to a cleaning robot, the first determining module is further configured for, after determining the type of the target according to the calculated ratio, adjusting operating power of a cleaning component of the cleaning robot according to the determined type of the target.

In another aspect, an embodiment of the present application provides a computer-readable storage medium with computer programs stored thereon, wherein the computer programs are executed by the processor to implement the target detection method according to any embodiment of the present application.

In another aspect, an embodiment of the present application provides an electronic device comprising a processor, a communication interface, a memory, and a communication bus, wherein the processor, the communication interface, and the memory communicate with each other via the communication bus;

the memory is configured for storing computer programs; and the processor is configured for executing the computer programs stored in the memory to implement the target detection method according to any embodiment of the present application.

In another aspect, an embodiment of the present application provides a computer program product, which is configured for causing a computer to implement steps of the target detection method according to any embodiment of the present application when executed in the computer.

In the embodiment of the present application, a plurality of images acquired by an image acquiring device are obtained as images to be detected when a region to be detected is illuminated by light sources with different illuminating angles, wherein the different illuminating angles correspond to the different images to be detected; and whether a target exists in the region to be detected is determined based on the gray scale differences between the obtained images to be detected with illuminating by the light sources of with different illuminating angles.

In the embodiment of the present application, a plurality of images acquired by the image acquiring device are obtained when the region to be detected is illuminated by light sources with different illuminating angles, wherein when a target exists in the region to be detected and light sources with different illuminating angles illuminate the region to be detected, the target may form shadows of different angles in the region to be detected, and thus when the images are acquired by the image acquiring device for the region to be detected with the region to be detected illuminated by light sources with different illuminating angles, the gray scale difference between different images are significant; and when no target exists in the region to be detected, there will be no shadow in the region to be detected, and thus when the images are acquired by the image acquiring device for the region to be detected with the region to be detected illuminated by light sources with different illuminating angles, the gray scale difference between different images are not significant. It can be determined that whether a target exists in the region to be detected according to the gray scale differences between the obtained images with illuminating by the light sources of with different illuminating angles, and therefore the target detecting process is simple and effective. Of course, any implementation of the product or method according to the present application does not necessarily need to achieve all the advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

The technical solutions according to the embodiments of the present application will be described clearly and completely in the following with reference to the appended drawings in the embodiments of the present application. Obviously, the described embodiments are only some, and not all, of the embodiments of the present application. All other embodiments obtained based on the embodiments of the present application by those skilled in the art without any creative efforts fall into the scope of protection defined by the present application.

The present application aims to provide a target detection method and apparatus in order to achieve simple and effective detection of the target.

Figure 1:
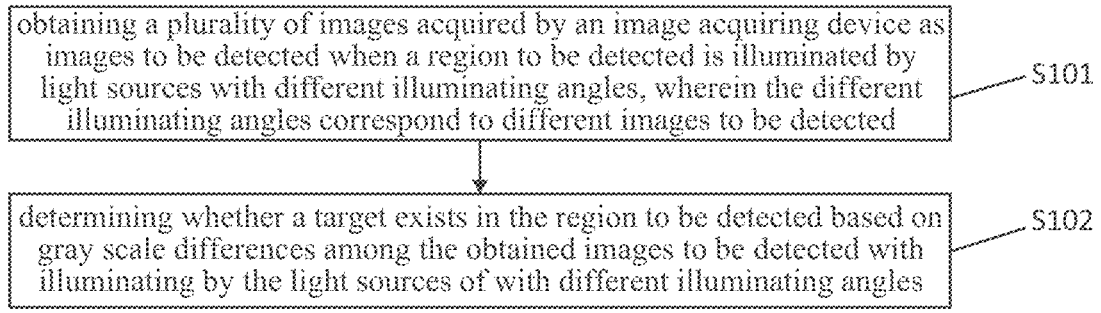
FIG. 1 is a schematic flowchart of a target detection method according to an embodiment of the present application.

As shown in FIG. 1, the present application provides a target detection method, which may include:

S101: obtaining a plurality of images acquired by an image acquiring device as images to be detected when a region to be detected is illuminated by light sources with different illuminating angles, wherein the different illuminating angles correspond to different images to be detected.

The target detection method according to the embodiment of the present application may be applied to any electronic device that can obtain images acquired by an image acquiring device, such as a computer, a mobile phone, a cleaning robot and so on. The image acquiring device may be a webcam, a camera, etc.

In one implementation, when an image acquiring device acquires images for a region to be detected that is illuminated by light sources with different illuminating angles, the position and the angle of the image acquiring device for image acquiring may be fixed. The electronic device may obtain a plurality of images acquired by the image acquiring device, wherein each illuminating angle may correspond to one or more images to be detected, and different illuminating angles correspond to different images to be detected. When each illuminating angle corresponds to a plurality of images to be detected, the plurality of images to be detected may be fused to enhance the information in the images to be detected, for example, color information.

S102: determining whether a target exists in the region to be detected based on gray scale differences among the obtained images to be detected with illuminating by the light sources of with different illuminating angles.

It can be understood that, when a target exists in the region to be detected and light sources with different illuminating angles illuminate the region to be detected, shadows of the target may be formed at different angles in the region to be detected. In this case, for images acquired by the image acquiring device for the region to be detected that is illuminated by light sources with different illuminating angles, the gray scale differences among the different images are significant. When no target exists in the region to be detected, there will be no shadow in the region to be detected. In this case, for the images acquired by the image acquiring device for the region to be detected that is illuminated by light sources with different illuminating angles, the gray scale differences among different images are not significant.

The above significant differences among the acquired images in a case of existence of a target and illuminating by the light sources with different illuminating angles is relative to the differences among the acquired images in a case of inexistence of a target and illuminating by the light sources with different illuminating angles.

In one implementation, after obtaining the images to be detected corresponding to different illuminating angles, the electronic device may calculate differences between each two images in the images to be detected corresponding to the different illuminating angles to obtain difference images for the each two images, and determine whether there is a pixel corresponding to a gray scale value higher than a preset gray scale value in each of difference images; and if it is determined that there is a pixel corresponding to a gray scale value higher than the preset gray scale value in at least one difference image, it can be determined that a target exists in the region to be detected.

In one case, the light sources with different illuminating angles may be light sources with the same type, so as to avoid significant differences in the gray scale values of the images acquired by the image acquiring device due to light sources with different types.

In the embodiment of the present application, a plurality of images acquired by the image acquiring device are obtained when the region to be detected is illuminated by light sources with different illuminating angles. When a target exists in the region to be detected and light sources with different illuminating angles illuminate the region to be detected, shadows of the target may be formed at different angles in the region to be detected; thus, when the images are acquired by the image acquiring device for the region to be detected that is illuminated by light sources with different illuminating angles, the gray scale differences among different images are significant. When no target exists in the region to be detected, there will be no shadow in the region to be detected, and thus when the images are acquired by the image acquiring device for the region to be detected that is illuminated by light sources with different illuminating angles, the gray scale differences among different images are not significant. It can be determined whether a target exists in the region to be detected according to the gray scale differences among the obtained images with illuminating by the light sources of with different illuminating angles, and therefore the target detecting process is simple and effective.

The target detection method according to the embodiment of the present application may detect in the region to be detected not only a target with a larger size, but also a minute target with a smaller size. A target with a larger size may refer to an object of which a ratio of the number of pixels occupied by the object to the number of all pixels in the image exceeds a first preset ratio, a minute target with smaller size may refer to an object of which a ratio of the number of pixels occupied by the object to the number of all pixels in the image does not exceed a second preset ratio.

In one implementation, the light sources with different illuminating angles may include a direct incidence light source with a beam emission direction perpendicular to a plane where the region to be detected is located, and an oblique incidence light source with a beam emission direction not perpendicular to the plane where the region to be detected is located.

The images to be detected may include: a first image to be detected corresponding to a direct incidence light source and a second image to be detected corresponding to an oblique incidence light source.

The step of determining whether a target exists in the region to be detected based on gray scale differences among the obtained images to be detected with illuminating by the light sources of with different illuminating angles (S102) may include:

determining a first region image from a first image to be detected and a second region image from a second image to be detected, based on an optical axis of the image acquiring device and a preset re-projection rule, wherein there is a corresponding relationship between pixels in the first region image and pixels in the second region image, and pixels with the corresponding relationship correspond to points at the same position in the region to be detected;

calculating a similarity value between the first region image and the second region image, based on gray scale values of each of pixels in the first region image and the second region image; and determining whether a target exists in the region to be detected based on the calculated similarity value.

The illumination range of the oblique incidence light source, the illumination range of the direct incidence light source, and the acquisition range of the image acquiring device have a certain overlapping range, for example, 90%.

That is to say, the illumination range of the oblique incidence light source, the illumination range of the direct incidence light source, and the acquisition range of the image acquiring device have a certain overlapping range, for example, an overlapping region exceeding a range of a preset overlapping region, which may be not lower than 50%, and may be 90%.

Figure 2A:
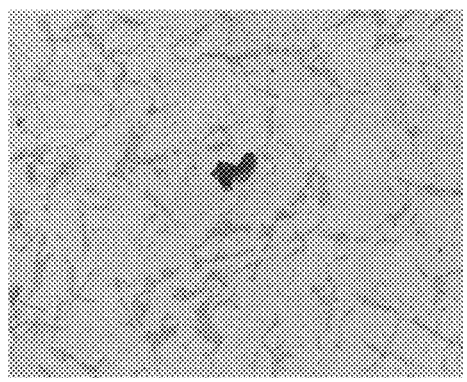
FIG. 2A is an exemplary diagram of an acquired image in a case that a direct incidence light source illuminates a region to be detected and a target exists in the region to be detected.
Figure 2B:
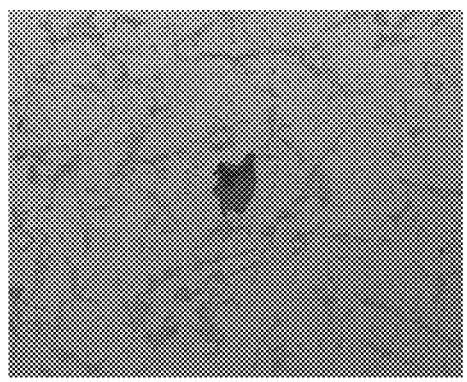
FIG. 2B is an exemplary diagram of an acquired image in a case that an oblique incidence light source illuminates a region to be detected and a target exists in the region to be detected.

In the embodiment of the present application, in order to better render the gray scale differences among images that are acquired when a target exists in the region to be detected and the region to be detected is illuminated by the light sources with different illuminating angles, the light sources with different illuminating angles may include: a direct incidence light source with a beam emission direction perpendicular to a plane where the region to be detected is located, and an oblique incidence light source with a beam emission direction not perpendicular to the plane where the region to be detected is located. It can be understood that, when a direct incidence light source illuminates the region to be detected, almost no shadow will be formed by the target existing in the region to be detected, as shown in FIG. 2A. FIG. 2A is an exemplary diagram of an image acquired in a case that a direct incidence light source illuminates a region to be detected and a target exists in the region to be detected. When a oblique light source illuminates the region to be detected, a shadow with larger area will be formed by the target existing in the region to be detected relative to the shadow formed with the direct incidence light source illuminating the region to be detected, as shown in FIG. 2B. FIG. 2B is an exemplary diagram of an image acquired in a case that an oblique incidence light source illuminates a region to be detected and a target exists in the region to be detected. When no target exists in the region to be detected, no shadow will be formed regardless of whether the region to be detected is illuminated by the direct incidence light source or the oblique incidence light source.

In one implementation, in order to ensure the accuracy of the detection results, the optical axis of the image acquiring device is perpendicular to the plane where the region to be detected is located; the distance between the image acquiring device and the direct incidence light source is not more than a first preset distance; and the distance between the image acquiring device and the oblique incidence light source is not less than a second preset distance.

The image acquiring device, the direct incidence light source, and the oblique light source may be arranged in the same horizontal plane. That is, the distances from the image acquiring device, the direct incidence light source, and the oblique light source, respectively, to the plane where the region to be detected is located are the same.

In one case, in order to better ensure that no shadow will be formed by the target existing in the region to be detected when the direct incidence light source illuminates the region to be detected, the distance between the image acquiring device and the direct incidence light source may be set not more than the preset first distance, and the optical axis of the image acquiring device is perpendicular to the plane where the region to be detected is located. Herein, the term "perpendicular to" according to the embodiment of the present application can be understood that, the difference between the included angle between the optical axis of the image acquiring device and the plane where the region to be detected is located and the angle of 90 degree is within a preset angle range.

In addition, the smaller the included angle between the oblique incidence light source and the plane where the region to be detected is located, the larger the area of the shadow will be formed by the target existing in the region to be detected. In one case, the distance between the image acquiring device and the oblique incidence light source may be set not lower than the preset second distance, wherein the preset second distance is larger than the preset first distance, and the preset second distance may further be larger than the distance from the oblique incidence light source to the plane where the region to be detected is located.

In the embodiment of the present application, the electronic device determines whether a target exists in the region to be detected according to the gray scale differences among the images to be detected with illuminating by the light sources of with different illuminating angles. The target detection method according to the embodiment of the preset application is more suitable for a situation in which the plane where the region to be detected is located has a solid color background. Because the target existing in the region to be detected will form a shadow when the oblique incidence light source illuminates the region to be detected, differences between the formed shadow and the solid color background are more significant than that between the formed shadow and the non-solid color background. The detection results obtained according to the embodiment of the present application is more accurate. The non-solid color background may be a background with texture.

For a situation in which the plane where the region to be detected is located has a background with texture, in the obtained images with a target existing in the region to be detected and the region to be detected illuminated by the oblique incidence light source, the target and the shadow formed by the target are difficultly distinguished from the texture. In an embodiment of the present application, in order to ensure the accuracy of the detection results in the situation that the plane where the region to be detected is located is the background with texture, after obtaining the first image to be detected and the second image to be detected, the electronic device may determine a first region image from the first image to be detected and a second region image from the second image to be detected based on the optical axis of the image acquiring device and the preset re-projection rule, to reduce the detection range for the images and the background interference. Reducing the detection range for the images may reduce the complexity of calculation to a certain extent.

Subsequently, the electronic device determines whether a target exists in the region to be detected based on the first region image and the second region image.

In one implementation, the step of determining a first region image from the first image to be detected and a second region image from the second image to be detected based on the optical axis of the image acquiring device and the preset re-projection rules may include:

determining an intersection point of a extension line of the optical axis of the image acquiring device with the plane where the region to be detected is located as a center point;

determining a target region from the region to be detected based on the center point and a preset length; and determining a first region image corresponding to the target region from the first image to be detected and a second region image corresponding to the target region from the second image to be detected based on a preset projection formula and coordinates of points in the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located; the $\rho$ represents a preset factor of proportionality; the s represents a preset factor of non-perpendicularity of the first horizontal axis to the first longitudinal axis; the ($c_x$, $c_y$) represents coordinates of an optical center of the image acquiring device in the image coordinate system where the first region image is located; the (u, v) represents coordinates of pixels of the first region image in the image coordinate system where the first region image is located; the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system; or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the ρ represents a preset factor of proportionality, the s represents a preset factor of non-perpendicularity of the third horizontal axis to the third longitudinal axis; the ($c_x$, $c_y$) represents coordinates of an optical center of the image acquiring device in the image coordinate system where the second region image is located; the (u, v) represents coordinates of the pixels of the second region image in the image coordinate system where the second region image is located, the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system.

In one case, the image coordinate system where the first region image is located may or may not coincide with the image coordinate system where the second region image is located. When the image coordinate system where the first region image is located coincides with the image coordinate system where the second region image is located, the origins of the image coordinate system where the first region image is located and the image coordinate system where the second region image is located is a pixel corresponding to a point at the same position in the region to be detected.

In one implementation, the value of s can be 0; wherein the $f_x$, $f_y$, $c_x$, $c_y$, and s are internal parameters of the image acquiring device, which can be directly determined by calibrating according to the Zhang's calibration method.

It can be understood that, as the optical axis of the image acquiring device is perpendicular to the plane where the region to be detected, there must be an intersection point of the extension line of the optical axis of the image acquiring device with the plane where the region to be detected is located and the intersection point is used as a center point. In one implementation, the electronic device may determine a region from the region to be detected as a target region based on the center point and a preset length. The target region may be a rectangular region or a circular region, the shape of which is not limited in the embodiment of the present application. When the target region is a rectangular region, the center point may be an intersection point of diagonal lines of the rectangular region; and when the target region is a circular region, the center point may be the center of the circular region.

Subsequently, the electronic device determines a first region image corresponding to the target region from the first images to be detected and a second region image corresponding to the target region from the second images to be detected, based on the preset re-projection formula and coordinates of points of the target region in the preset three-dimensional rectangular coordinate system.

In an implementation, the preset three-dimensional rectangular coordinate system is a coordinate system established based on the optical center of the image acquiring device. Specifically, the optical center of the image acquiring device can be used as the origin; the optical axis of the image acquiring device can be used as a vertical axis and used as a second vertical axis, a connecting line between the image acquiring device and the oblique incidence light source can be used as a horizontal axis and used as a second horizontal axis; a straight line passing through the optical center of the image acquiring device and perpendicular to a plane where the second vertical axis and the horizontal axis are located can be used as a longitudinal axis and used as a second longitudinal axis. A connecting line between the image acquiring device and the oblique light source is a straight line passing through the optical center of the image acquiring device and parallel to a plane where the region to be detected is located the second vertical axis can be represented as a Z axis, the second horizontal axis can be represented as a X axis, and the second longitudinal axis can be represented as a Y axis.

Figure 3:
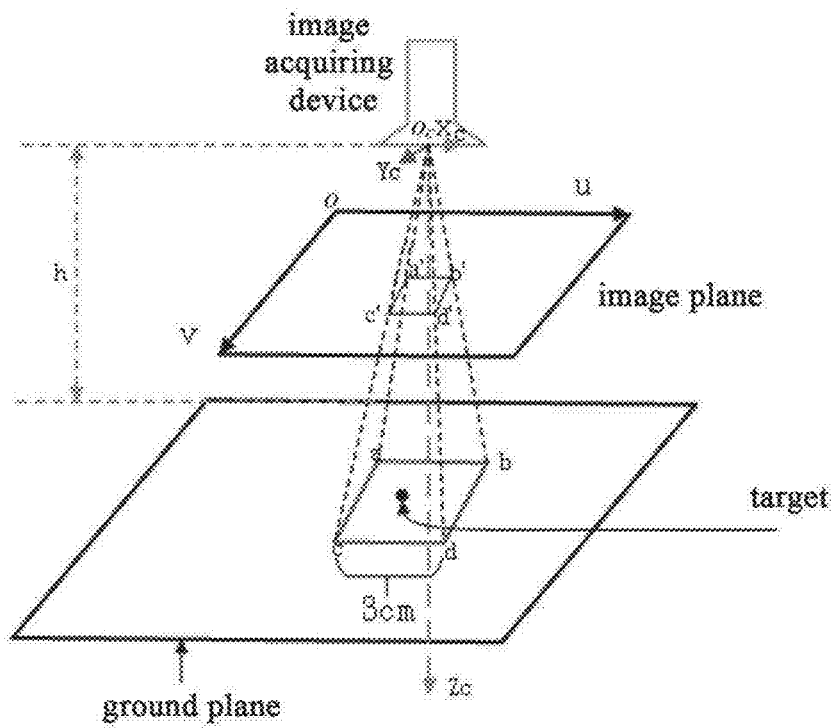
FIG. 3 is an exemplary diagram showing a position mapping relationship among an image acquiring device, an image plane, and a region to be detected.

For example, FIG. 3 is an exemplary diagram of a position mapping relationship among the image acquiring device, the image plane, and the region to be detected, wherein the image plane is a plane where the first image to be detected or the second image to be detected is located, the plane where the first image to be detected is located coincides with the plane where the second image to be detected, the plane where the region to be detected is located is the ground, and the optical axis of the image acquiring device is perpendicular to the ground. The coordinate system $O_C$-$X_C Y_C Z_C$ in FIG. 3 is the preset three-dimensional rectangular coordinate system; the coordinate system O-UV is the image coordinate system where the first region image or the second region image is located, the "h" shown in FIG. 3 may represent the distance from the image acquiring device to the ground.

The electronic device determines an intersection point of the extension line of the optical axis of the image acquiring device with the ground as a center point.

The electronic device determines a target region abcd from the ground based on the center point and a preset length of 3 cm; wherein the target region abcd is a square region with a side length of 3 cm, and wherein the above mentioned center point is the center of the target region abcd.

The electronic device determines a corresponding region a'b'c'd' from the image plane based on a preset projection formula and the target region abcd, that is, determining a first region image from the first image to be detected and a second region image from the second image to be detected.

The step of calculating a similarity value between the first region image and the second region image, based on gray scale values of each of pixels in the first region image and the second region image may include:

normalizing the gray scale value of each pixel in the first region image to obtain the normalized gray scale value of each pixel in the first region image; and normalizing the gray scale value of each pixel in the second region image to obtain the normalized gray scale value of each pixel in the second region image; and calculating the similarity value between the first region image and the second region image based on a normalized cross-correlation algorithm (NCC), the normalized gray scale value of each pixel in the first region image, and the normalized gray scale value of each pixel in the second region image.

It can be understood that, when a target exists in the region to be detected, compared with the first image to be detected by the image acquiring device with the region to be detected illuminated by the direct incidence light source, the gray scale value of the region around the target region in the second image to be detected acquired by the image acquiring device with the region to be detected illuminated by the oblique incidence light source is significantly different from that in the first image to be detected, due to the shadow formed by the target with the oblique incidence light source illuminating. When no target exists in the region to be detected, the gray scale value of the region around the target region in the second image to be detected is not significantly different from that in the first image to be detected.

Based on the principle, when a target exists in the region to be detected, the gray scale value of the region around the target region in the second image is significant different from that in the first image to be detected. When no target exists in the region to be detected, the gray scale value of the region around the target region in the second image to be detected is not significant different from that in the first image to be detected.

In the implementation, it can be determined whether a target exists in the region to be detected by the way of block matching. The idea of the block matching generally is: since the brightness of a single pixel is indistinguishable, and the brightness of a single pixel is easily affected by the background of the corresponding region, for example, the texture of the ground, then all pixels of the preset region in the image are taken for overall comparison. During the comparison, it is assumed that the gray values of all pixels of the preset region in each image is unchanged, and thus the comparison process will be effective. Based on the principle, before performing block matching, the gray scale values of the pixels of the first region image and the gray scale values of the pixels of the second region image can be normalized into interval (0, 1) by the gray value normalization process, and then the similarity value of the first region image and the second region image are calculated and compared with the normalized cross-correlation algorithm. When calculating and comparing the similarity value of the first region image and the second region image by using the cross-correlation, the formula used may be:

$$S(A, B)_{NCC} = \frac{\sum_{i,j} A(i, j) B(i, j)}{\sqrt{\sum_{i,j} A(i, j)^2 \sum_{i,j} B(i, j)^2}},$$

wherein the $S(A, B)_{NCC}$ represents the similarity value of the first region image and the second region image; the $A(i, j)$ represents the pixel with the coordinate $(i, j)$ of the first region image, and the $B(i, j)$ represents the pixel with the coordinates $(i, j)$ of the second region image.

The $A(i, j)$ representing the pixel of the first region image with the coordinate $(i, j)$ can be understood that: the $A(i, j)$ represents the gray scale value of the pixel with the coordinate $(i, j)$ of the first region image. The $B(i, j)$ representing the pixel of the second region image with the coordinate $(i, j)$ can be understood that: the $B(i, j)$ represents the gray scale value of the pixel with the coordinate $(i, j)$ of the second region image.

When the similarity value of the first region image and the second region image is 0, it indicates that the first region image and the second region image are dissimilar. The closer the calculated similarity value of the first region image and the second region image is to 1, it may indicate that the more similar the first region image and the second region image are.

In one implementation, after the similarity value of the first region image and the second region image is calculated, the electronic device may determine whether a target exists in the region to be detected base on the similarity value. It can be understood that, the closer the similarity value is to 1, it indicates that the more similar the first region image and the second region image are. The more similar the first region image and the second region image are, the smaller the gray scale differences between the first region image and the second region image is, and then it may indicate that the greater the possibility that no target exists in the target region is.

In one case, a threshold may be preset, and when the calculated similarity value is less than the threshold, it indicates that the gray scale differences between the first region image and the second region image is large, and it can be determined that a target exists in the region to be detected; when the calculated similarity value is not less than the threshold, it indicates that gray scale differences between the first region image and the second region image is not large, and it can be determined that no target exists in the region to be detected. Specifically, in the embodiment of the present application, the step of determining whether a target exists in the region to be detected based on the calculated similarity value may comprise:

determining whether the calculated similarity value is less than a preset similarity threshold:

when the calculated similarity value is less than the preset similarity threshold, determining that a target exists in the region to be detected; and when the calculated similarity value is not less than the preset similarity threshold, determining that no target exists in the region to be detected.

In one implementation, the electronic device can determine subsequently the shadow region formed by the target based on the first region image and the second region image after determining the target region, that is, a target exists in the region to be detected further determine the coordinates of the shadow region in the preset three-dimensional rectangular coordinate system, that is, the coordinates of actual position thereof based on the preset projection formula, then determine the type of the target approximately based on the shape information of the oblique incidence light source, and thus determine the type of target.

In the embodiment of the present application, after determining a target exists in the region to be detected, the method may further comprise:

determining a gray scale difference image between the first region image and the second region image based on the gray scale values of each pixel of the first region image and the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

the $f_x$ represents an equivalent focal length in a direction of a third horizontal axis of the image coordinate system where the second region image is located, the $f_y$ represents an equivalent focal length in a direction of a third longitudinal axis of the image coordinate system where the second region image is located, the ρ represents a preset factor of proportionality; the s represents a preset factor of non-perpendicularity of the third horizontal axis to the third longitudinal axis; the ($c_x$, $c_y$) represents coordinates of an optical center of the image acquiring device in the image coordinate system where the second region image is located, the (u, v) represents coordinates of the pixels of the second region image in the image coordinate system where the second region image is located; the ($X_C$, $Y_C$, $Z_C$) represents coordinates of points of the second projection region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

In one case, the gray scale differences between the pixels with the same position of the first region image and the second image can be calculated point by point, and then the gray scale difference image between the first region image and the second region image is obtained, wherein the formula with which the gray scale difference image is obtained may be:

$T = A(i,j) - B(i,j)$ wherein the difference between the gray scale value of the pixel of the first region image and the pixel with the coordinate (i, j) of the second region image is the gray scale value of the pixel with the coordinate (i, j) in the map of differences of the gray scale values; the A(i, j) represents the pixel with the coordinate (i, j) of the first region image, and the B(i, j) represents the pixel with coordinate (i, j) of the second region image.

The A(i, j) representing the pixel of the first region image with the coordinate (i, j) can be understood that: the A(i, j) represents the gray scale value of the pixel with the coordinate (i, j) of the first region image. The B(i, j) representing the pixel of the second region image with the coordinate (i, j) can be understood that the B(i, j) represents the gray scale value of the pixel with the coordinate (i, j) of the second region image.

When the T which the pixels correspond to in the map of differences of the gray scale values is larger than the preset gray scale threshold, it is determined that the pixel is in the shadow region generated by the detected target. The pixels with the gray scale values which are larger than the preset gray scale threshold are determined from the gray scale difference image as projection pixels by scanning pixel by pixel, and subsequently a first projection region in the second region image is determined. In one case, the process of determining the first projection region in the second region image may be: using the region where all of the determined projection pixels are located as the first projection region; or may be: determining a minimum bounding rectangle region, trapezoidal region or circular region where all the projection pixels are located as the first projection region based on all of the determined projection pixels, etc., which are all possible.

Based on the preset projection formula, the electronic device converts the coordinates of the first projection region in the image coordinate system where the second region image is located into the coordinates in the preset three-dimensional rectangular coordinate system, that is, determining the second projection region which the first projection region corresponds to from the region to be detected after determining the first projection region.

Then, the electronic device determines shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system, and then determines a type of the target based on the shape information of the target. The determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system may comprise:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target, and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

When the electronic device has detected a target exists in the target region, in the embodiment of the present application, the electronic device can approximately determine the shape information of the target according to the shadow region formed by the target and the relationship between the positions of the target and the oblique incidence light source, wherein the shape information comprises the maximum cross-section length of the target and target height, and the target height may be the maximum height of the target.

For example, in one case, in order to facilitate the description of the principle of determining the shape information of the target, the following example needs to be simplified in two places: firstly, it is assumed that a target exists in the target region of the region to be detected, and the existing target is a regular cube model; the assumption is only for the intuitive display of the principle of determining the shape information of the target, and does not define the embodiment of the present application. In practice, the maximum height in the shape information of the existing target which is any irregular target can be determined by the target detection method according to the embodiment of the present application; secondly, it is assumed that the existing target is right at the center point of the acquisition region of the image acquiring device.

Figure 4A:
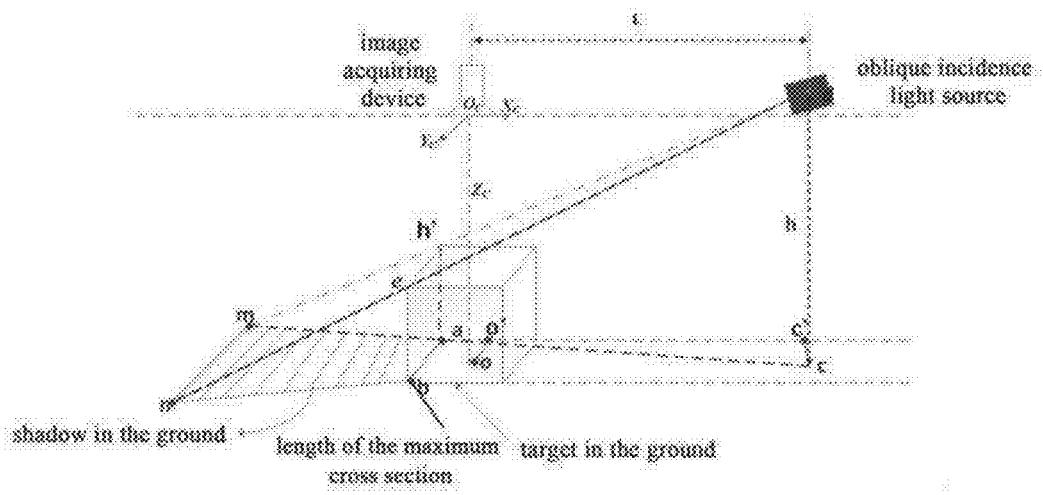
FIG. 4A is an exemplary diagram in which an oblique incidence light source illuminates a region to be detected and a target exists in the region to be detected.

Based on the above assumptions, as shown in FIG. 4A, the plane where the region to be detected is the ground, and the shaded region shown in FIG. 4A is: when the ground is illuminated by an oblique incidence light source, the shadow region formed by the existing target is the second projection region mentioned in the embodiment of the present application; the point O in FIG. 4A is the projection point of the image acquiring device in the ground, which is located at the center of the bottom surface of the existing target; the distance of the image acquiring device, the direct incidence light source and the oblique incidence light source from the ground are all h; the distance between the oblique incidence light source and the image acquiring device is L, and the oblique incidence light source is represented with d, the coordinate of which is represented with (L, 0, 0) in the preset three-dimensional rectangular coordinate system ($X_C$, $Y_C$, $Z_C$).

When it is assumed that the target is a cube, the coordinates of the points in the second projection region in the preset three-dimensional rectangular coordinate system ($X_C$, $Y_C$, $Z_C$) as shown in FIG. 4A is determined, wherein point m is the point which the minimum horizontal coordinate value and the minimum longitudinal coordinate value correspond to, with the coordinate ($X_{min}$, $Y_{min}$, h) in the preset three-dimensional rectangular coordinate system ($X_C$, $Y_C$, $Z_C$); point n is the point which the minimum horizontal coordinate value and the maximum longitudinal coordinate value correspond to, with the coordinate ($X_{min}$, $Y_{max}$, h) in the preset three-dimensional rectangular coordinate system ($X_C$, $Y_C$, $Z_C$), point b is the point which the maximum horizontal coordinate value and the maximum longitudinal coordinate value correspond to, with the coordinate ($X_{max}$, $Y_{max}$, h) in the preset three-dimensional rectangular coordinate system ($X_C$, $Y_C$, $Z_C$), point a is the point which the maximum horizontal coordinate value and the minimum longitudinal coordinate value correspond to, with the coordinate ($X_{max}$, $Y_{min}$, h) in the preset three-dimensional rectangular coordinate system ($X_C$, $Y_C$, $Z_C$).

The electronic device uses the difference between the longitudinal coordinates of the second point b and the third point a as the maximum cross-section length in the shape information of the target; as shown in FIG. 4A, it uses the distance between point b and point a as the maximum cross-section length in the shape information of the target.

As shown in FIG. 4A, the distance from the oblique incidence light source to the furthest position of the shadow formed by the existing target can be represented with a straight line segment md or a line segment nd, wherein the distances of the point in and the point n, respectively, from the oblique incidence light source are equal. In practice, there will be a offset of position of the existing target with respect to the center point of the acquisition region of the image acquiring device, and at this time, the distance of the straight line segment md or the line segment nd may also be directly calculated according to the coordinates of the corresponding endpoints in the preset three-dimensional coordinate system ($X_C$, $Y_C$, $Z_C$) respectively. Wherein the corresponding endpoints of the straight line segment md are point m and point n, and the corresponding endpoints of the straight line segment nd are point n and point d.

Point C is the projection point of the oblique incidence light source in the ground with the coordinate (L, 0, h) in the preset three-dimensional rectangular coordinate system ($X_C$, $Y_C$, $Z_C$), wherein triangle mcd and triangle ncd are congruent right triangles.

Based on the Pythagorean theorem, the length of the straight line segment mc can be obtained by using the straight line segment md and the straight line segment dc, that is, mc=$\sqrt{md^2-dc^2}$, wherein the length of the straight line segment dc is equal to the vertical coordinate value of point c, that is, the coordinate on the axis Zc, which is h.

Based on the linearity of the light source, the connecting line between the oblique incidence light source d and the point n must pass through the point e of the cube target, and the triangle neb is similar to the triangle ncd, at this time, the straight line segment eb can be considered to be the maximum height of the cube target, that is, the target height in the shape information of the target, and the length of the straight line segment eb can be obtained based on the similar triangle principle, that is, $$\frac{dc}{nc} = \frac{ed}{nb},$$

wherein the length of the straight line segment nb is the distance between the point n and point b.

In another implementation, the determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system may comprise:

determining a point corresponding to a minimum horizontal coordinate value as a first point from the points in the second projection region, based on coordinates of points of the second projection region in the preset three-dimensional rectangular system;

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system; and using an absolute value of the difference between the longitudinal coordinate value of each point in the pair of target points as a maximum cross-section length in the shape information of the target.

In one case, the target may be an irregularly shaped object, and at this time, for such a target, the maximum cross-section length of the target and the maximum height of the target, that is, the target height, can be obtained based on the shadow formed by the target. In one case, when the target is an irregularly shaped object, the shape of the shadow region formed by the target is also irregular, that is, the shape of the second projection region is also irregular; in the shadow region formed by the target, there may be only one point corresponding to the minimum horizontal coordinate value and only one point corresponding to the maximum horizontal coordinate value.

The electronic device determines the point corresponding to the minimum horizontal coordinate value as the first point from the points in the second projection region after determining the coordinate of each points in the second projection region.

Figure 4B:
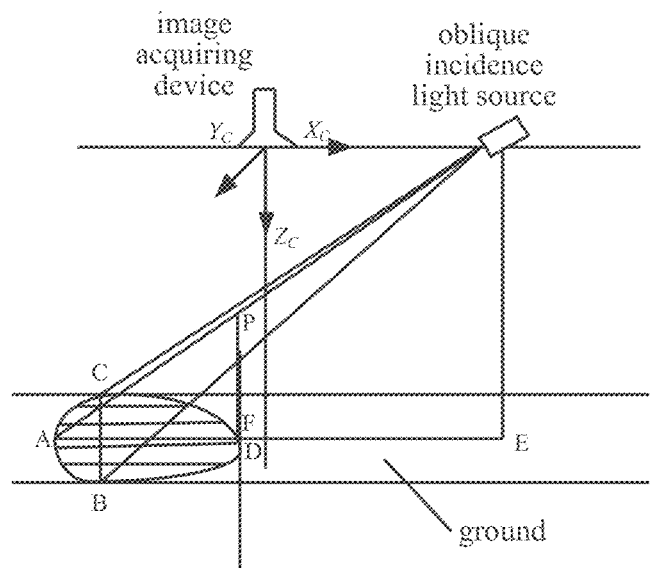
FIG. 4B is another exemplary diagram in which an oblique incidence light source illuminates a region to be detected and a target exists in the region to be detected.

Assuming that the plane where the region to be detected is the ground as shown in FIG. 4B, and the shadow region shown in FIG. 4B is: when the ground is illuminated by the oblique incidence light source, the shadow region formed by the existing target is the second projection region mentioned in the embodiment of the present application; the point O in FIG. 4B is the projection point of the image acquiring device in the ground, and the distances of the image acquiring device, the direct incidence light source (unmarked in the figure), and the oblique incidence light source are all h, the distance between the oblique incidence light source and the image acquiring device is L. and the oblique incidence light source may be represented with M, with the coordinate (L, 0, 0) in the preset three-dimensional rectangular coordinate system $(X_C, Y_C, Z_C)$; in the second projection region, there is only one point A corresponding to the maximum horizontal coordinate value, and the point A can be represent with coordinate $(X_{min}, Y_A, h)$ in the preset three-dimensional rectangular coordinate system $(X_C, Y_C, Z_C)$; the straight line segment AE shown in FIG. 4 is the connecting line between a first point A and the projection point of the oblique incidence light source in the ground.

The electronic device determines intersection points of a connecting line, which is between the first point and the projection point of the oblique incidence light source in the plane where the region to be detected is located, and the second projection region; as shown in FIG. 4B, it determines the intersection points of the straight line segment AE and the second projection region, and as shown in FIG. 4B, the points on the straight line segment AF are all the intersection points of the straight line segment AE and the second projection region;

The electronic device determines the coordinate of the point corresponding to the maximum horizontal coordinate value in the preset three-dimensional rectangular coordinate system; point F is shown in FIG. 4B, with the coordinate $(X_F, Y_F, h)$ of point F in the preset three-dimensional rectangular coordinate system;

The electronic device determines the target height in the shape information of the target, based on the similar triangle principle, by using the coordinate of the first point A in the preset three-dimensional rectangular coordinate system, the coordinate of the oblique incidence light source M in the preset three-dimensional rectangular coordinate system, the coordinate of the projection point E of the oblique incidence light source in the plane where the region to be detected is located in the preset three-dimensional rectangular coordinates system, and the coordinate of the intersection point corresponding to the maximum horizontal coordinate value in the preset three-dimensional rectangular coordinate system; as shown in FIG. 4B, triangle AME is right triangle, and the parallel line made parallel to the straight line segment ME based on point F must pass the straight line segment AM;

The electronic device may use the determined length of the straight line segment as the target height in the shape information of the target, wherein line segment FP is the parallel line made parallel to the straight line segment ME, and point P is the intersection point of the straight line segment FP and the straight line segment AM.

The electronic device determines a pair of points corresponding to the same horizontal coordinate value and the maximum difference between the longitudinal coordinate values as a target pair of points from the points in the second projection region, based on the coordinates of the points in the second projection region in the preset three-dimensional rectangular coordinate system; as shown in FIG. 4B, the pair of target points may be point C and point B, with the coordinate $(X_C, Y_C, h)$ of point C and the coordinate $(X_B, Y_B, h)$ of point B in the preset three-dimensional rectangular coordinate system;

The electronic device uses the difference between the longitudinal coordinate value of each point in the pair of target points as the maximum cross-section length in the shape information of the target, as shown in FIG. 4B, it uses the absolute value of the difference between the longitudinal coordinate values of point C and point B as the maximum cross-section length in the shape information of the target, that is, uses $|Y_C-Y_B|$ as the maximum cross-section length in the shape information of the target.

In an implementation, when the electronic device determines the target height in the shape information of the target, it may no longer determines the intersection point of the connecting line, which is between the first point and the projection point of the oblique incidence light source in the plane where the region to be detected is located, and the second projection region, after determining the coordinate of the first point in the preset three-dimensional catersian coordinate system; and then determines the point corresponding to the maximum horizontal coordinate value, for example, the point D shown in FIG. 4B from the points in the second projection region based on the points in the second projection region in the preset three-dimensional rectangular coordinate system.

The electronic device determines the point corresponding to the maximum horizontal coordinate value in the plane where the region to be detected is located based on the point corresponding to the maximum horizontal coordinate value in the determined second projection region; wherein as shown in FIG. 4B, the point corresponding to the maximum horizontal coordinate value in the determined second projection region has the coordinate $(X_{max}, Y_D, h)$ in the preset three-dimensional rectangular coordinate system, that is, the straight line $X_C = X_{max}$ is determined in the ground.

The electronic device determines the target straight line which intersect the connecting line between the first point and the oblique incidence light source in the straight line made and determines the intersection point which is intersected, by making a straight line perpendicular to the plane where the region to be detected is located based on the determination of all the points corresponding to the maximum horizontal coordinate value in the plane where the region to be detected is located.

The electronic device may use the distance on the target straight line between the determined intersection point which is intersected and the intersection point of the target straight line and the plane where the region to be detected is located as the target height in the shape information of the target.

In one implementation, the electronic device can subsequently determine the type of the target after determining the shape information of the detected target, that is, the maximum cross-sectional length and the height. Specifically, in an embodiment of the present application, determining the type of the target based on the shape information of the target may comprise:

calculating a ratio of the maximum cross-section length of the target to the target height of the target; and determining the type of the target according to the calculated ratio, wherein when the calculated ratio is less than or equal to a first preset threshold, determining that the type of the target is a silk-like object; when the calculated ratio is more than the first preset threshold and less than or equal to a second preset threshold, determining that the type of the target is a granular object; when the calculated ratio is more than the second preset threshold, determining that the type of the target is a floc-like object.

It can be understood that, the first preset threshold and the second preset threshold are both larger than 0, and the first preset threshold<the second preset threshold. In one implementation, the first preset threshold may be taken as 0.1, and the second preset threshold may be taken as 10.

In one implementation, the target detection method according to the embodiment of the present application may be applied to a cleaning robot, and accordingly, after determining the type of the target according to the calculated ratio, the method may further comprise:

adjusting operating power of a cleaning component of the cleaning robot according to the determined type of the target.

In the embodiment of the present application, the target detection method can achieve the detection of minute targets in the region to be detected, further the determination of the shape information of the detected minute targets including the maximum cross-section length and height, and then the determination of the type of the detected minute target according to the shape information of the target. And when the target detection method is applied to a cleaning robot, the cleaning robot can adjust the operating power of the cleaning component of the cleaning robot itself according to the determined type of the minute target; for example, if the cleaning component is a dust suction device, the suction power of the dust suction device can be adjusted, in order to achieve efficient and intelligent cleaning tasks.

Figure 5:
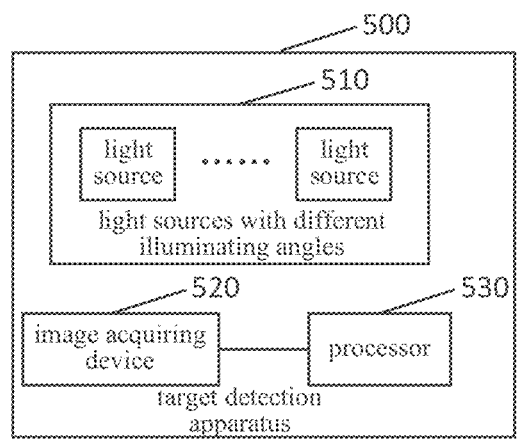
FIG. 5 is a schematic structural diagram of a target detecting apparatus according to an embodiment of the present application.

Corresponding to the method embodiment, as shown in FIG. 5, an embodiment of the present application provides a target detecting apparatus 500, which may comprise: light source 510 with different illuminating angle, an image acquiring device 520, and a processor 530;

the light sources 510 with different illuminating angles are configured for illuminating a region to be detected;

the image acquiring device 520 is configured for acquiring images when a region to be detected is illuminated by the light sources with different illuminating angles; and the processor 530 is configured for obtaining the images acquired by the image acquiring device as images to be detected and determining whether a target exists in the region to be detected based on gray scale differences among the obtained images to be detected with illuminating by the light sources of with different illuminating angles.

In the embodiment of the present application, a plurality of images acquired by the image acquiring device are obtained when the region to be detected is illuminated by light sources with different illuminating angles, wherein when a target exists in the region to be detected and light sources with different illuminating angles illuminate the region to be detected, the target may form shadows of different angles in the region to be detected, and thus when the images are acquired by the image acquiring device for the region to be detected with the region to be detected illuminated by light sources with different illuminating angles, the gray scale differences between different images are significant; and when no target exists in the region to be detected, the region to be detected will not form a shadow, and thus when the images are acquired by the image acquiring device for the region to be detected with the region to be detected illuminated by light sources with different illuminating angles, the gray scale differences between different images are not significant. It can be determined that whether a target exists in the region to be detected according to the gray scale differences between the obtained images with illuminating by the light sources of with different illuminating angles, and therefore the target detecting process is simple and effective.

The target detection method according to the embodiment of the present application may detect not only the target with a larger size in the region to be detected, but also the minute target with a smaller size in the region to be detected, wherein the target with a larger size is the object of which the ratio of the number of its occupied pixels to the number of all pixels in the image exceeds a first preset ratio; the minute target with smaller size is the object of which the ratio of the number of its occupied pixels to the number of all pixels in the image does not exceed a second preset ratio.

Figure 6:
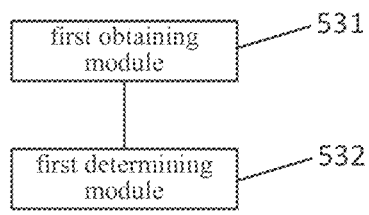
FIG. 6 is a schematic structural diagram of a processor according to an embodiment of the present application.

In one implementation, as shown in FIG. 6, the processor 530 comprises:

a first obtaining module 531 configured for obtaining a plurality of images acquired by an image acquiring device when a region to be detected is illuminated by light sources with different illuminating angles as images to be detected, wherein the different illuminating angles correspond to different images to be detected; and a first determining module 532 configured for determining whether a target exists in the region to be detected based on gray scale differences among the obtained images to be detected with illuminating by the light sources with different illuminating angles.

In one implementation, the light sources with different illuminating angles comprise: a direct incidence light source with a beam emission direction perpendicular to a plane where the region to be detected is located, and an oblique incidence light source with a beam emission direction not perpendicular to the plane where the region to be detected is located;

the images to be detected comprise a first image to be detected corresponding to a direct incidence light source, and a second image to be detected corresponding to an oblique incidence light source;

the first determining module 532, specifically configured for:

determining a first region image from the first image to be detected and a second region image from the second image to be detected based on an optical axis of the image acquiring device and a preset re-projection rule, wherein there is a corresponding relationship between pixels of the first region image and pixels of the second region image, and pixels with the corresponding relationship correspond to points at the same position in the region to be detected;

calculating a similarity value between the first region image and the second region image, based on gray scale values of each pixel of the first region image and the second region image; and determining whether a target exists in the region to be detected based on the calculated similarity value.

In one implementation, the optical axis of the image acquiring device is perpendicular to a plane where the region to be detected is located, a distance between the image acquiring device and the direct incidence light source is not more than a first preset distance; a distance between the image acquiring device and the oblique incidence light source is not less than a second preset distance, and the second preset distance is larger than the first preset distance.

In one implementation, the first determining module 532 is specifically configured for:

determining an intersection point of an extension line of the optical axis of the image acquiring device with the plane where the region to be detected is located as a center point;

determining a target region from the region to be detected based on the center point and a preset length, and determining a first region image corresponding to the target region from the first image to be detected and a second region image corresponding to the target region from the second image to be detected based on a preset projection formula and coordinates of points of the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located; the $\rho$ represents a preset factor of proportionality; the s represents a preset factor of non-perpendicularity of the first horizontal axis to the first longitudinal axis; the $(c_x, c_y)$ represents coordinates of an optical center of the image acquiring device in the image coordinate system where the first region image is located; the (u, v) represents coordinates of pixels of the first region image in the image coordinate system where the first region image is located; the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system, or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality, the s represents a preset factor of non-perpendicularity of the third horizontal axis to the third longitudinal axis; the $(c_x, c_y)$ represents coordinates of an optical center of the image acquiring device in the image coordinate system where the second region image is located; the (u, v) represents coordinates of the pixels of the second region image in the image coordinate system where the second region image is located, the $(X_C, Y_C, Z_C)$ represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system.

In one implementation, the first determining module 532 is specifically configured for:

normalizing gray scale values of each pixel of the first region image to obtain the normalized gray scale values of each pixel of the first region image;

normalizing gray scale values of each pixel of the second region image to obtain the normalized gray scale values of each pixel of the second region image, and calculating the similarity value between the first region image and the second region image based on a normalized cross-correlation algorithm, the normalized gray scale values of each pixel of the first region image, and the normalized gray scale values of each pixel of the second region image.

In one implementation, the first determining module 532 is specifically configured for:

determining whether the calculated similarity value is less than a preset similarity threshold;

when the calculated similarity value is less than the preset similarity threshold, determining that a target exists in the region to be detected; and when the calculated similarity value is not less than the preset similarity threshold, determining that no target exists in the region to be detected.

In one implementation, the first determining module 532 is further configured for:

after determining that a target exists in the region to be detected, the method, determining a gray scale difference image between the first region image and the second region image based on the gray scale values of each pixel of the first region image and the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis; the ($c_x$, $c_y$) represents coordinates of an optical center of the image acquiring device in the image coordinate system where the second region image is located; the (u, v) represents coordinates of the pixels of the second region image in the image coordinate system where the second region image is located; the ($X_C$, $Y_C$, $Z_C$) represents coordinates of points of the second projection region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

In one implementation, the first determining module 532 is specifically configured for:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target, and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

In one implementation, the first determining module 532 is specifically configured for:

determining a point corresponding to a minimum horizontal coordinate value as a first point from the points in the second projection region, based on coordinates of points of the second projection region in the preset three-dimensional rectangular system;

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system; and using an absolute value of the difference between the longitudinal coordinate value of each point in the pair of target points as a maximum cross-section length in the shape information of the target.

In one implementation, the first determining module 532 is specifically configured for:

calculating a ratio of the maximum cross-section length of the target to the target height of the target; and determining the type of the target according to the calculated ratio, wherein when the calculated ratio is less than or equal to a first preset threshold, determining that the type of the target is a silk-like object; when the calculated ratio is more than the first preset threshold and less than or equal to a second preset threshold, determining that the type of the target is a granular object; when the calculated ratio is more than the second preset threshold, determining that the type of the target is a floc-like object.

In one implementation, the apparatus is applied to a cleaning robot, and the first determining module is further configured for, after determining the type of the target according to the calculated ratio, adjusting operating power of a cleaning component of the cleaning robot according to the determined type of the target.

Figure 7:
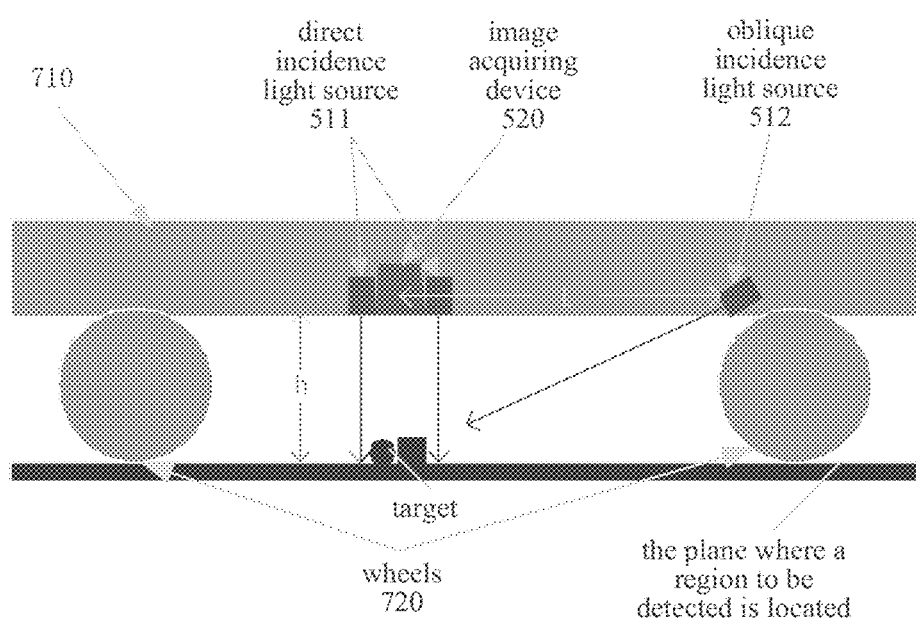
FIG. 7 is another schematic structural diagram of a target detecting apparatus according to an embodiment of the present application.

In one implementation, as shown in FIG. 7, the light sources 510 with different illuminating angles may comprise: a direct incidence light source 511 with a beam emission direction perpendicular to the plane where the region to be detected is located, and an oblique incidence light source 512 with a beam emission direction not perpendicular to the plane where the region to be detected is located; the optical axis of the image acquiring device 520 is perpendicular to the plane where the region to be detected is located; the distance between the image acquiring device 520 and the direct incidence light source 511 is not more than a first preset distance, the distance between the image acquiring device and the oblique incidence light source 512 is not less than a second preset distance, and the second preset distance is larger than the first preset distance. Wherein in one implementation, the direct incidence light source may comprise one or more light sources. As shown in FIG. 7, the direct incidence light source may comprise two light sources.

In one implementation, as shown in FIG. 7, the target detecting apparatus may further comprise a mobile underpan 710, the direct incidence light source 511, the oblique incidence light source 512, the processor 530 (not shown in the figure), and the image acquiring device 520 may be arranged on the mobile underpan, the mobile underpan 710 is further arranged with wheels 720, wherein the number of the wheels 720 is at least two.

In one implementation, the distance of the direct incidence light source 511, the oblique incidence light source 512, and the image acquiring device 520 from the plane where the region to be detected is a first height h, and the distance of the oblique incidence light source 512 from the image acquiring device 520 is a first length L, wherein the first height h is smaller than the first length L.

It can be understood that, in one case, the target detecting apparatus may be a cleaning robot. At this time, the cleaning robot may further comprise a cleaning component, and the first determining module in the processor 530 may adjust the operating power of the cleaning component according to the determined type of the target. Specifically, the first determining module may adjust the operating power of the cleaning component according to the determined type of the target, and control the cleaning component to clean based on the adjusted operating power.

Corresponding to the embodiment of the method, an embodiment of the present application provides a computer-readable storage medium, with computer programs stored thereon, wherein the computer programs are executed by the processor to implement the target detection method according to the embodiment of the present application, and the target detection method may comprise:

obtaining a plurality of images acquired by an image acquiring device when a region to be detected is illuminated by light sources with different illuminating angles as images to be detected, wherein the different illuminating angles correspond to different images to be detected, and determining whether a target exists in the region to be detected based on gray scale differences among the obtained images to be detected with illuminating by the light sources with different illuminating angles.

In the embodiment of the present application, a plurality of images acquired by the image acquiring device are obtained when the region to be detected is illuminated by light sources with different illuminating angles, wherein when a target exists in the region to be detected and light sources with different illuminating angles illuminate the region to be detected, the target may form shadows of different angles in the region to be detected, and thus when the images are acquired by the image acquiring device for the region to be detected with the region to be detected illuminated by light sources with different illuminating angles, the gray scale differences between different images are significant; and when no target exists in the region to be detected, there will be no shadow in the region to be detected, and thus when the images are acquired by the image acquiring device for the region to be detected with the region to be detected illuminated by light sources with different illuminating angles, the gray scale differences between different images are not significant. It can be determined that whether a target exists in the region to be detected according to the differences between the gray scale values of the obtained images with illuminating by the light sources of with different illuminating angles, and therefore the target detecting process is simple and effective.

The target detection method according to the embodiment of the present application may detect not only the target with a larger size in the region to be detected, but also the minute target with a smaller size in the region to be detected, wherein the target with a larger size is the object of which the ratio of the number of its occupied pixels to the number of all pixels in the image exceeds a first preset ratio; the minute target with smaller size is the object of which the ratio of the number of its occupied pixels to the number of all pixels in the image does not exceed a second preset ratio.

Corresponding to the embodiment of the method, an embodiment of the present application provides an electronic device comprising a processor, a communication interface, a memory, and a communication bus, wherein the processor, the communication interface, and the memory communicate with each other via the communication bus;

the memory is configured for storing computer programs;

the processor is configured for executing the computer programs stored in the memory to implement steps of the target detection method according to any embodiment of the present application.

In the embodiment of the present application, a plurality of images acquired by the image acquiring device are obtained when the region to be detected is illuminated by light sources with different illuminating angles, wherein when a target exists in the region to be detected and light sources with different illuminating angles illuminate the region to be detected, the target may form shadows of different angles in the region to be detected, and thus when the images are acquired by the image acquiring device for the region to be detected with the region to be detected illuminated by light sources with different illuminating angles, the gray scale differences between different images are significant; and when no target exists in the region to be detected, there will be no shadow in the region to be detected, and thus when the images are acquired by the image acquiring device for the region to be detected with the region to be detected illuminated by light sources with different illuminating angles, the gray scale differences between different images are not significant. It can be determined that whether a target exists in the region to be detected according to the gray scale differences between the obtained images with illuminating by the light sources of with different illuminating angles, and therefore the target detecting process is simple and effective.

The target detection method according to the embodiment of the present application may detect not only the target with a larger size in the region to be detected, but also the minute target with a smaller size in the region to be detected, wherein the target with a larger size is the object of which the ratio of the number of its occupied pixels to the number of all pixels in the image exceeds a first preset ratio; the minute target with smaller size is the object of which the ratio of the number of its occupied pixels to the number of all pixels in the image does not exceed a second preset ratio.

Corresponding to the embodiment of the method, an embodiment of the present application provides a computer program product, which is configured for causing the computer to implement steps of the target detection method according to any embodiment of the present application when executed in the computer.

In the embodiment of the present application, a plurality of images acquired by the image acquiring device are obtained when the region to be detected is illuminated by light sources with different illuminating angles, wherein when a target exists in the region to be detected and light sources with different illuminating angles illuminate the region to be detected, the target may form shadows of different angles in the region to be detected, and thus when the images are acquired by the image acquiring device for the region to be detected with the region to be detected illuminated by light sources with different illuminating angles, the gray scale differences between different images are significant; and when no target exists in the region to be detected, there will be no shadow in the region to be detected, and thus when the images are acquired by the image acquiring device for the region to be detected with the region to be detected illuminated by light sources with different illuminating angles, the gray scale differences between different images are not significant. It can be determined that whether a target exists in the region to be detected according to the gray scale differences between the obtained images with illuminating by the light sources of with different illuminating angles, and therefore the target detecting process is simple and effective.

The target detection method according to the embodiment of the present application may detect not only the target with a larger size in the region to be detected, but also the minute target with a smaller size in the region to be detected, wherein the target with a larger size is the object of which the ratio of the number of its occupied pixels to the number of all pixels in the image exceeds a first preset ratio; the minute target with smaller size is the object of which the ratio of the number of its occupied pixels to the number of all pixels in the image does not exceed a second preset ratio.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a % an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of system is described briefly, since they are substantially similar to the embodiment of the method, and the related contents can refer to the description of the embodiment of the method.

The descriptions mentioned-above are only preferred embodiments of the present application, and are not intended to limit the scope of the present application. Any modification, equivalent, or improvement within the spirit and principle of this application are included within the scope of this application.

The invention claimed is:
1. A target detection method, comprising:
obtaining a plurality of images acquired by an image acquiring device when a region to be detected is illuminated by light sources with different illuminating angles as images to be detected, wherein the different illuminating angles correspond to different images to be detected; and
determining whether a target exists in the region to be detected based on gray scale differences among the obtained images to be detected;
wherein the light sources with different illuminating angles comprise: a direct incidence light source with a beam emission direction perpendicular to a plane where the region to be detected is located, and an oblique incidence light source with a beam emission direction not perpendicular to the plane where the region to be detected is located;
wherein the images to be detected comprise: a first image to be detected corresponding to a direct incidence light source, and a second image to be detected corresponding to an oblique incidence light source;
wherein determining whether a target exists in the region to be detected based on gray scale differences among the obtained images to be detected comprises:
determining a first region image from the first image to be detected and a second region image from the second image to be detected based on an optical axis of the image acquiring device and a preset re-projection rule, there is a corresponding relationship between pixels of the first region image and pixels of the second region image, and pixels with the corresponding relationship correspond to points at the same position in the region to be detected;

calculating a similarity value between the first region image and the second region image, based on gray scale values of each pixel of the first region image and the second region image; and determining whether a target exists in the region to be detected based on the calculated similarity value.

2. The method according to claim 1, wherein the optical axis of the image acquiring device is perpendicular to a plane where the region to be detected is located; a distance between the image acquiring device and the direct incidence light source is not more than a first preset distance; a distance between the image acquiring device and the oblique incidence light source is not less than a second preset distance; and the second preset distance is larger than the first preset distance.

3. The method according to claim 1, wherein determining a first region image from the first image to be detected and a second region image from the second image to be detected based on an optical axis of the image acquiring device and a preset re-projection rule comprises:

determining an intersection point of an extension line of the optical axis of the image acquiring device with the plane where the region to be detected is located as a center point;

determining a target region from the region to be detected based on the center point and a preset length; and determining a first region image corresponding to the target region from the first image to be detected and a second region image corresponding to the target region from the second image to be detected based on a preset projection formula and coordinates of points of the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix}$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located; the $\rho$ represents a preset factor of proportionality; the s represents a preset factor of non-perpendicularity of the first horizontal axis to the first longitudinal axis; the ($c_x$, $c_y$) represents coordinates of an optical center of the image acquiring device in the image coordinate system where the first region image is located; the (u, v) represents coordinates of pixels of the first region image in the image coordinate system where the first region image is located; the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system; or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis; the ($c_x$, $c_y$) represents coordinates of an optical center of the image acquiring device in the image coordinate system where the second region image is located; the (u, v) represents coordinates of the pixels of the second region image in the image coordinate system where the second region image is located; the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system.

4. The method according to claim 1, wherein calculating a similarity value between the first region image and the second region image, based on gray scale values of each pixel of the first region image and of the second region image comprises:

normalizing a gray scale value of each pixel of the first region image to obtain the normalized gray scale values of each pixel of the first region image;

normalizing a gray scale value of each pixel of the second region image to obtain the normalized gray scale values of each pixel of the second region image; and calculating the similarity value between the first region image and the second region image based on a normalized cross-correlation algorithm, the normalized gray scale value of each pixel of the first region image, and the normalized gray scale value of each pixel of the second region image.

5. The method according to claim 1, wherein determining whether a target exists in the region to be detected based on the calculated similarity value comprises:

determining whether the calculated similarity value is less than a preset similarity threshold;

when the calculated similarity value is less than the preset similarity threshold, determining that a target exists in the region to be detected; and when the calculated similarity value is not less than the preset similarity threshold, determining that no target exists in the region to be detected.

6. The method according to claim 5, wherein after determining that a target exists in the region to be detected, the method further comprises:

determining a gray scale difference image between the first region image and the second region image based on the gray scale values of each pixel of the first region image and of the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix}$$

the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the $\rho$ represents a preset factor of proportionality; the s represents a preset factor of non-perpendicularity of the third horizontal axis to the third longitudinal axis; the $(c_x, c_y)$ represents coordinates of an optical center of the image acquiring device in the image coordinate system where the second region image is located; the (u, v) represents coordinates of the pixels of the second region image in the image coordinate system where the second region image is located; the $(X_C, Y_C, Z_C)$ represents coordinates of points of the second projection region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

7. The method according to claim 6, wherein determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system comprises:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target; and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

8. The method according to claim 6, wherein determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system comprises:

determining a point corresponding to a minimum horizontal coordinate value as a first point from the points in the second projection region, based on coordinates of points of the second projection region in the preset three-dimensional rectangular system;

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system; and using an absolute value of the difference between the longitudinal coordinate value of each point in the pair of target points as a maximum cross-section length in the shape information of the target.

9. The method according to claim 6, wherein determining the type of the target based on the shape information of the target comprises:

calculating a ratio of the maximum cross-section length of the target to the target height of the target; and determining the type of the target according to the calculated ratio, wherein when the calculated ratio is less than or equal to a first preset threshold, determining that the type of the target is a silk-like object; when the calculated ratio is more than the first preset threshold and less than or equal to a second preset threshold, determining that the type of the target is a granular object; when the calculated ratio is more than the second preset threshold, determining that the type of the target is a floc-like object.

10. The method according to claim 9, wherein the method is applied to a cleaning robot, after determining the type of the target according to the calculated ratio, the method further comprises:

adjusting operating power of a cleaning component of the cleaning robot according to the determined type of the target.

11. A target detecting apparatus, comprising: light sources with different illuminating angles, an image acquiring device, and a processor;

the light sources with different illuminating angles are configured for illuminating a region to be detected;

the image acquiring device is configured for acquiring images when a region to be detected is illuminated by the light sources with different illuminating angles; and the processor is configured for obtaining the images acquired by the image acquiring device as images to be detected and determining whether a target exists in the region to be detected based on gray scale differences among the obtained images to be detected with illuminating by the light sources of with different illuminating angles;

wherein the light sources with different illuminating angles comprise: a direct incidence light source with a beam emission direction perpendicular to a plane where the region to be detected is located, and an oblique incidence light source with a beam emission direction not perpendicular to the plane where the region to be detected is located;

wherein the images to be detected comprise: a first image to be detected corresponding to a direct incidence light source, and a second image to be detected corresponding to an oblique incidence light source;

wherein the processor is configured for:

determining a first region image from the first image to be detected and a second region image from the second image to be detected based on an optical axis of the image acquiring device and a preset re-projection rule, there is a corresponding relationship between pixels of the first region image and pixels of the second region image, and pixels with the corresponding relationship correspond to points at the same position in the region to be detected;

calculating a similarity value between the first region image and the second region image, based on gray scale values of each pixel of the first region image and of the second region image; and determining whether a target exists in the region to be detected based on the calculated similarity value.

12. The target detecting apparatus according to claim 11, wherein the processor is configured for:

obtaining a plurality of images acquired by an image acquiring device when a region to be detected is illuminated by light sources with different illuminating angles as images to be detected, wherein the different illuminating angles correspond to different images to be detected; and determining whether a target exists in the region to be detected based on gray scale differences among the obtained images to be detected.

13. The target detecting apparatus according to claim 12, wherein the optical axis of the image acquiring device is perpendicular to a plane where the region to be detected is located; a distance between the image acquiring device and the direct incidence light source is not more than a first preset distance; a distance between the image acquiring device and the oblique incidence light source is not less than a second preset distance; and the second preset distance is larger than the first preset distance.

14. The target detecting apparatus according to claim 13, wherein the processor is configured for:

determining an intersection point of an extension line of the optical axis of the image acquiring device with the plane where the region to be detected is located as a center point;

determining a target region from the region to be detected based on the center point and a preset length; and determining a first region image corresponding to the target region from the first image to be detected and a second region image corresponding to the target region from the second image to be detected based on a preset projection formula and coordinates of points of the target region in a preset three-dimensional rectangular coordinate system, wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix}$$

wherein the $f_x$ represents an equivalent focal length in a direction of a first horizontal axis of the image coordinate system where the first region image is located; the $f_y$ represents an equivalent focal length in a direction of a first longitudinal axis of the image coordinate system where the first region image is located; the $\rho$ represents a preset factor of proportionality; the s represents a preset factor of non-perpendicularity of the first horizontal axis to the first longitudinal axis; the ($c_x$, $c_y$) represents coordinates of an optical center of the image acquiring device in the image coordinate system where the first region image is located; the (u, v) represents coordinates of pixels of the first region image in the image coordinate system where the first region image is located; the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the first horizontal axis is identical to the direction of the second horizontal axis of the preset three-dimensional rectangular coordinate system and the direction of the first longitudinal axis is identical to the direction of the second longitudinal axis of preset three-dimensional rectangular coordinate system; or, the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the ρ represents a preset factor of proportionality; the s represents a preset factor of non-perpendicularity of the third horizontal axis to the third longitudinal axis; the ($c_x$, $c_y$) represents coordinates of an optical center of the image acquiring device in the image coordinate system where the second region image is located; the (u, v) represents coordinates of the pixels of the second region image in the image coordinate system where the second region image is located; the ($X_C$, $Y_C$, $Z_C$) represents coordinates of points of the target region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system, wherein the processor is configured for:

normalizing a gray scale value of each pixel of the first region image to obtain the normalized gray scale values of each pixel of the first region image;

normalizing a gray scale value of each pixel of the second region image to obtain the normalized gray scale values of each pixel of the second region image; and calculating the similarity value between the first region image and the second region image based on a normalized cross-correlation algorithm, the normalized gray scale value of each pixel of the first region image, and the normalized gray scale value of each pixel of the second region image, wherein the processor is configured for:

determining whether the calculated similarity value is less than a preset similarity threshold;

when the calculated similarity value is less than the preset similarity threshold, determining that a target exists in the region to be detected; and when the calculated similarity value is not less than the preset similarity threshold, determining that no target exists in the region to be detected, wherein the processor is configured for:

after determining that a target exists in the region to be detected, determining a gray scale difference image between the first region image and the second region image based on the gray scale values of each pixel of the first region image and of the second region image;

determining pixels with gray scale values larger than a preset gray scale threshold from the gray scale difference image as projection pixels;

determining a first projection region in the second region image based on the determined projection pixels;

determining a second projection region corresponding to the first projection region from the region to be detected based on a preset projection formula; wherein the preset projection formula is:

$$\rho \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} X_C \\ Y_C \\ Z_C \\ 1 \end{bmatrix},$$

the $f_x$ represents an equivalent focal length in a direction of a third horizontal axis of the image coordinate system where the second region image is located; the $f_y$ represents an equivalent focal length in a direction of a third longitudinal axis of the image coordinate system where the second region image is located; the ρ represents a preset factor of proportionality; the s represents a preset factor of non-perpendicularity of the third horizontal axis to the third longitudinal axis; the ($c_x$, $c_y$) represents coordinates of an optical center of the image acquiring device in the image coordinate system where the second region image is located; the (u, v) represents coordinates of the pixels of the second region image in the image coordinate system where the second region image is located; the ($X_C$, $Y_C$, $Z_C$) represents coordinates of points of the second projection region in a preset three-dimensional rectangular coordinate system; and the preset three-dimensional rectangular coordinate system is a coordinate system established based on the optical center of the image acquiring device, in which the direction of the third horizontal axis is identical to the direction of the second horizontal axis of the preset three-dimensional rectangular coordinate system and the direction of the third longitudinal axis is identical to the direction of the second longitudinal axis of the preset three-dimensional rectangular coordinate system;

determining shape information of the target, based on coordinates of points of the second projection region in the preset three-dimensional rectangular system, coordinates of the oblique incidence light source in the preset three-dimensional rectangular system, and coordinates of a projection point of the oblique incidence light source in a plane where the region to be detected is located in the preset three-dimensional rectangular system; and determining a type of the target based on the shape information of the target.

15. The target detecting apparatus according to claim 14, wherein the processor is configured for:

determining a minimum horizontal coordinate value and a maximum horizontal coordinate value, based on coordinates of points of the second projection region in the preset three-dimensional rectangular system;

determining a maximum longitudinal coordinate value corresponding to the minimum horizontal coordinate value from the points of the second projection region as a first point;

determining a maximum longitudinal coordinate value corresponding to the maximum horizontal coordinate value from the points in the second projection region a second point;

determining a minimum longitudinal coordinate value corresponding to the maximum horizontal coordinate value from the points in the second projection region as a third point;

using a difference between longitudinal coordinated values of the second point and the third point as a maximum cross-section length in the shape information of the target; and determining a target height in the shape information of the target, based on a similar triangle principle, by using coordinates of the first point in the preset three-dimensional rectangular coordinate system, coordinates of the oblique incidence light source in the preset three-dimensional rectangular coordinate system, coordinates of the third point in the preset three-dimensional rectangular coordinates system, and coordinates of the projection point of the oblique incidence light source in the plane where the region to be detected is located in the preset three-dimensional rectangular coordinate system.

16. The apparatus according to claim 14, wherein the processor is configured for:

determining a point corresponding to a minimum horizontal coordinate value as a first point from the points in the second projection region, based on coordinates of points of the second projection region in the preset three-dimensional rectangular system;

determining coordinates of the first point in the preset three-dimensional rectangular coordinate system;

determining intersection points of a connecting line, which is between the first point and the projection point of the oblique incidence light source in a plane where the region to be detected is located, with the second projection region;

determining coordinates of a intersection point corresponding to a maximum horizontal coordinate value in the preset three-dimensional rectangular coordinate system from the intersection points;

determining the target height in the shape information of the target, based on the similar triangle principle, by using coordinates of the first point in the preset three-dimensional rectangular coordinate system, coordinates of the oblique incidence light source in the preset three-dimensional rectangular coordinate system, coordinates of the projection point of the oblique incidence light source in a plane where the region to be detected is located in the preset three-dimensional rectangular coordinates system, and coordinates of the intersection point corresponding to the maximum horizontal coordinate value in the preset three-dimensional rectangular coordinate system;

determining a pair of points corresponding to the same horizontal coordinate value and a maximum difference between the longitudinal coordinate values as a pair of target points from the points in the second projection region, based on the coordinates of the points in the second projection region in the preset three-dimensional rectangular coordinate system; and using an absolute value of the difference between the longitudinal coordinate value of each point in the pair of target points as a maximum cross-section length in the shape information of the target.

17. The apparatus according to claim 14, wherein the processor is configured for:

calculating a ratio of the maximum cross-section length of the target to the target height of the target; and determining the type of the target according to the calculated ratio, wherein when the calculated ratio is less than or equal to a first preset threshold, determining that the type of the target is a silk-like object; when the calculated ratio is more than the first preset threshold and less than or equal to a second preset threshold, determining that the type of the target is a granular object; when the calculated ratio is more than the second preset threshold, determining that the type of the target is a floc-like object, wherein the apparatus is applied to a cleaning robot, the processor is further configured for, after determining the type of the target according to the calculated ratio, adjusting operating power of a cleaning component of the cleaning robot according to the determined type of the target.

18. A non-transitory computer-readable storage medium with computer programs stored thereon, wherein the computer programs are executed by a processor to implement the target detection method according to claim 1.

19. An electronic device, comprising a processor, a communication interface, a memory, and a communication bus, wherein the processor, the communication interface, and the memory communicate with each other via the communication bus;

the memory is configured for storing computer programs;

the processor is configured for executing the computer programs stored in the memory to implement the target detection method according to claim 1.

* * * * *